United States Patent
Montgomery

(10) Patent No.: US 9,753,361 B2
(45) Date of Patent: Sep. 5, 2017

(54) TRANSPARENT DISPLAY INCLUDING A SCREEN WITH PATTERNED LIGHT DEFLECTIVE ELEMENTS

(71) Applicant: Sharp Kabushiki Kaisha, Osaka (JP)

(72) Inventor: David James Montgomery, Oxfordshire (GB)

(73) Assignee: Sharp Kabushiki Kaisha, Osaka (JP)

( * ) Notice: Subject to any disclaimer, the term of this patent is extended or adjusted under 35 U.S.C. 154(b) by 264 days.

(21) Appl. No.: 14/529,711

(22) Filed: Oct. 31, 2014

(65) Prior Publication Data

US 2016/0124295 A1    May 5, 2016

(51) Int. Cl.

| | |
|---|---|
| *G03B 21/625* | (2014.01) |
| *G02B 3/00* | (2006.01) |
| *G02B 13/16* | (2006.01) |
| *G02B 13/22* | (2006.01) |
| *G03B 21/10* | (2006.01) |

(Continued)

(52) U.S. Cl.
CPC ......... *G03B 21/625* (2013.01); *G02B 3/0006* (2013.01); *G02B 13/16* (2013.01); *G02B 13/22* (2013.01); *G03B 21/10* (2013.01); *G03B 21/60* (2013.01); *G03B 21/62* (2013.01); *G02B 27/2221* (2013.01); *G09F 9/302* (2013.01); *G09F 19/18* (2013.01)

(58) Field of Classification Search
CPC .......................... G03B 21/625; G02B 27/2221
USPC ............................................. 359/459; 353/79
See application file for complete search history.

(56) References Cited

U.S. PATENT DOCUMENTS

| | | | | |
|---|---|---|---|---|
| 5,589,979 A | * | 12/1996 | Martin | G03B 21/00 353/122 |
| 6,997,558 B2 | * | 2/2006 | Perlin | H04N 13/0488 345/419 |

(Continued)

FOREIGN PATENT DOCUMENTS

| | | |
|---|---|---|
| CN | 103050068 | 4/2013 |
| GB | 2428307 | 1/2007 |

(Continued)

OTHER PUBLICATIONS

Sun et al., Novel Transparent Emissive Display on Optic-Clear Phosphor Screen, 2013.

*Primary Examiner* — Christopher Mahoney
(74) *Attorney, Agent, or Firm* — Renner, Otto, Boisselle & Sklar, LLP

(57) ABSTRACT

A transparent display device includes a screen that has a plurality of light deflecting elements that are separated by transparent areas, and a projector device. The projector device is configured to direct light onto the light deflecting elements and not onto the transparent areas. The display device may include a first screen and a second screen separated longitudinally relative to the projector, wherein each screen respectively has a plurality of light deflecting elements. The projector is configured to direct light onto the light deflecting elements and not onto the transparent areas of the two screens such that light from the first and second light deflecting elements appear in different virtual depth planes. Alternatively, a single screen may have first and second pluralities of light deflecting elements of different optical powers, such that light from the first and second light deflecting elements appear in different virtual depth planes.

16 Claims, 14 Drawing Sheets

(51) Int. Cl.
    *G03B 21/60*     (2014.01)
    *G03B 21/62*     (2014.01)
    *G02B 27/22*     (2006.01)
    *G09F 19/18*     (2006.01)
    *G09F 9/302*     (2006.01)

(56)     References Cited

U.S. PATENT DOCUMENTS

| | | | |
|---|---|---|---|
| 7,724,431 B2 * | 5/2010 | Field | G03B 21/56 |
| | | | 359/443 |
| 7,733,310 B2 * | 6/2010 | Hajjar | B82Y 10/00 |
| | | | 345/84 |
| 8,212,744 B2 | 7/2012 | Kuo et al. | |
| 2004/0183968 A1 | 9/2004 | Hosaka | |
| 2005/0264880 A1 | 12/2005 | Kim et al. | |
| 2007/0024967 A1 * | 2/2007 | Peterson | G03B 21/60 |
| | | | 359/459 |

FOREIGN PATENT DOCUMENTS

| | | |
|---|---|---|
| JP | 2001005101 | 1/2001 |
| JP | 2005292679 | 10/2005 |
| JP | 2006/133636 A | 5/2006 |
| JP | 2007536595 A | 12/2007 |
| JP | 2010085477 | 4/2010 |
| JP | 5343490 | 11/2013 |

\* cited by examiner

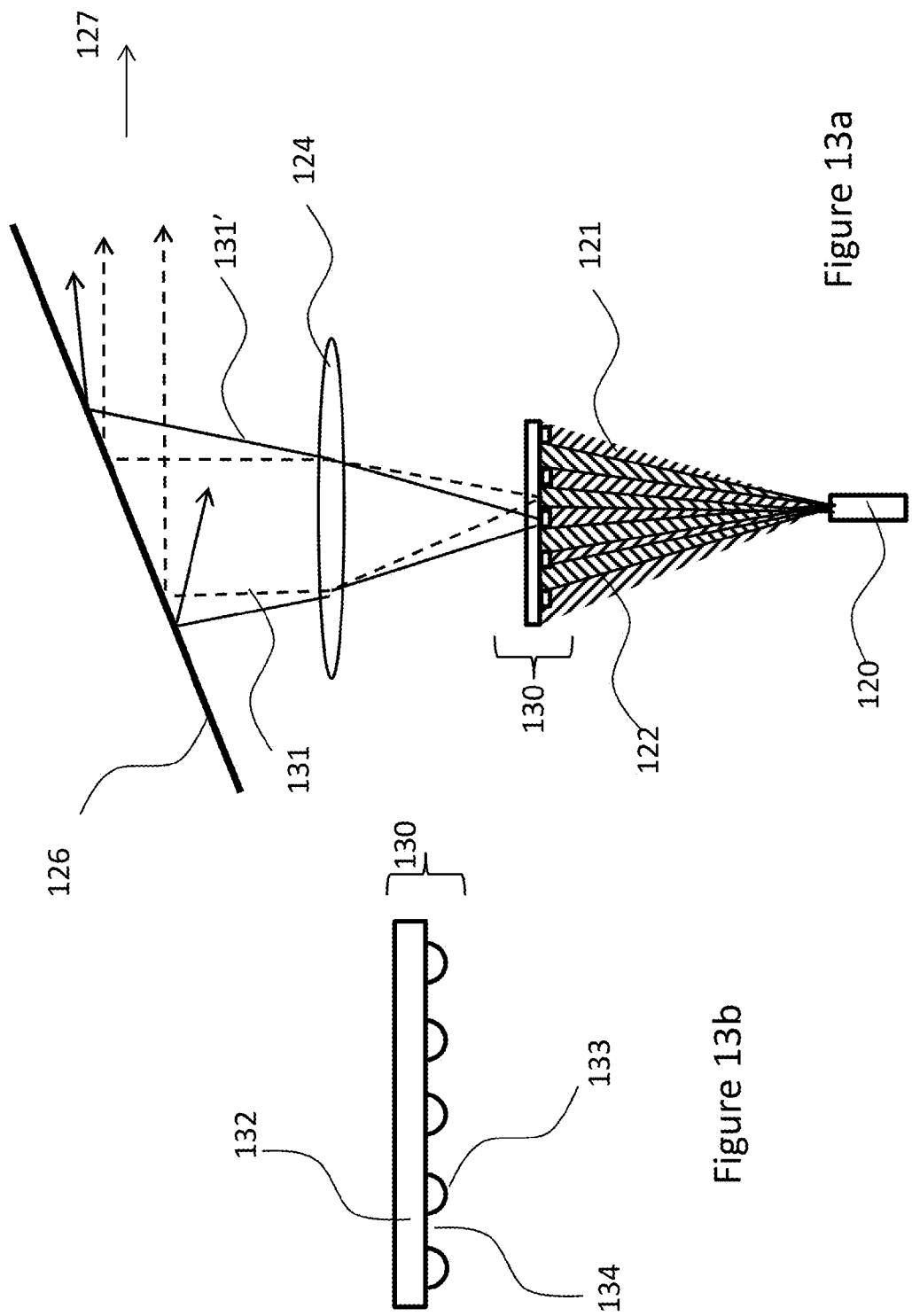

TRANSPARENT DISPLAY INCLUDING A SCREEN WITH PATTERNED LIGHT DEFLECTIVE ELEMENTS

TECHNICAL FIELD

The present invention concerns transparent displays for signage, advertising and other information requiring visualization of objects behind the display. Applications also include head-up displays and head-mounted displays for augmented reality applications.

BACKGROUND ART

Transparent displays are an increasingly interesting area for such applications as retail advertising and window displays. In particular, the use in a window requires a high level of transparency and the use as a retail display for perishable or light sensitive items (such as food or clothing) also requires a high transparency. A number of technologies have been suggested in order to achieve this aim. For example:

Transparent displays based on LCD or OLED technologies are common but typically suffer from low overall transparency, below 40% in the case of LCDs and 60% for OLEDs. OLEDs are also difficult to make large and bright.

Alternative technologies such as cholesteric LC or switchable scattering screens typically have low viewing angle and low switching speed that limit the potential applications.

There are projection screen based patents such as US2005/0264880 (Kim et al., Dec. 1, 2005) and JP2007/536595 (LG, Dec. 13, 2007) that concern themselves with optics and projector systems for improved ambient contrast, but the screens they describe are opaque. Rear projection TV screens, such as prism structures in JP5343490 (Tetsuya et al., Apr. 15, 2010) are also designed not to be seen through, and therefore are not transparent.

GB 2428307 (Roy et al., Jan. 24, 2007) is a transparent screen based on diffusing light, which is simple to fabricate but has a low clarity of view, in that objects seen through the screen are diffused and not well defined.

JP 2001/005101 (Atsushi et al., Jan. 12, 2001) has a differential scatterer, scattering from one direction (projector) and clear in the other (viewer). The clarity, although better, is generally low. It is also difficult to fabricate.

JP 2005/292679 (Kazunori, Oct. 20, 2005) and U.S. Pat. No. 8,212,744 (Kuo et al., Jan. 24, 2008) have louvre diffuser mirrors that scatter light forward, whereas the screen is transparent when viewed along the louvre. The viewing angle is very restricted here and it is also difficult to fabricate. The form factor of the display is also not suited to some applications, for example a window.

More recent screens, such as CN103050068 (Wang, Apr. 17, 2013) and Holopro, use holographic sheets, which are non-diffusing and not prism based and can redirect light. Another recent screen by Sun Innovations is described in paper 54.4 at the Society of Information Display Week Conference, Vancouver, June 2013. This screen uses tailored RGB nanophosphors on a screen that respond to blue light of slightly different wavelengths. The phosphors do not respond to other wavelengths so appear transparent.

Although highly transparent (above 80%), the efficiency is limited, the holographic displays have some loss of clarity and have colour issues. They are also difficult and expensive to fabricate, especially at large size. The light sensitive material used to make the hologram also limits lifetime and reliability in well lit environments such as an external window Referring to the above conventional configurations, there is no high transparency transparent screen (>80%) that is simple and cheap to manufacture, with a wide viewing angle and with no colour issues, that has high materials reliability, is able to run at video rates and has high image display efficiency, i.e. a high screen gain for the transparency, i.e. gain/(1−transparency)>>1.

SUMMARY OF INVENTION

This present invention concerns a transparent display ideally suited for use as a window or retail display, as well as alternative transparent displays or augmented reality applications such as HMD, HUD and others.

Exemplary embodiments of the present invention include a sheet of clear material such as glass or plastic as a window screen on which are patterned light deflecting elements such as a scattering area or prism or other optical structure. Each element is separated from adjacent elements by plain clear material with no such light deflecting properties. Each element forms a "unit cell" on the surface, and the area of the light deflecting element is significantly less than the plain clear area in the unit cell. The pattern is made appropriate for the application and the unit cells may be different in different places. Exemplary embodiments of the present invention also includes a projector arrangement or method which directs light substantially onto the elements and not on the clear area between the elements. The projector may be normal throw, short throw or ultrashort throw.

Because the light deflective elements are a small overall cross-sectional area of the screen, the screen appears clear and transparent, especially if the elements are smaller than resolvable by the eye of the viewer at the normal viewing distance.

The light deflective elements can be molded into a plastic screen or made as a sheet and laminated onto glass. They can be made simply by known cheap processes and contain no light sensitive material (in general, though the invention can have a phosphor as the deflecting element) which can limit reliability and lifetime. The invention can be scaled easily form small to very large size.

The light deflective element used will determine optical viewing angle and colour properties. For example, a roughened area on the plastic (that can be done easily using laser processing) used with a DLP colour wheel projector light source would have a wide angle of view with few colour problems.

The update rate from the display would depend only on the projector and this can easily be done with known image generation systems.

The screen gain for the transparency would be determined by the efficiency of the direction of light onto the light deflective elements and not into the clear areas. In principle the transparency would be 1−(area of element in unit cell)/(area of unit cell), and hence the screen gain for the transparency (as defined above) would then be (gain of elements alone)×(area of unit cell)/(area of element in unit cell), which can be significantly greater than one even if the elements are wide angle scattering and have a gain of less than 1. By using prism or holographic elements that direct light into a narrow angle (gain of elements already >1), the performance can be further enhanced.

Square light deflective elements 0.1 mm in size with a pitch of 0.3 mm in two directions would have a transparency 1−(1/9)=89%. Lambertian scattering elements would have an ideal gain of approx. 0.5 (light scattered in two directions), and a screen gain for transparency of 4.5, ×4.5 brighter (or more efficient) than an ideal simple beamsplitting transparent screen for the same transparency.

As mentioned, the light deflective elements can be scattering areas, prisms, lenses, phosphors (and nanophosphors) or holographic or other types of light deflecting elements.

The pattern of the light deflective elements can be uniform, zoned, random or existing only in certain areas. The pattern can include different types of elements for creating windows in different directions or positions in space.

The light deflective elements can be forming a real image at the screen (e.g. scattering dots) or redirecting a virtual image (e.g. prism structures).

The projector can be a laser scanning or DLP or other temporally separated colour projector. LCOS or spatially separated colour projectors would need element design or light direction in order to cope with this.

The projector can be high resolution so as to have image data only in those pixels aligned with a light deflective element.

The projector can be automatically aligned with the screen using a camera and a set of patterned images sequentially shown on the screen, and the brightness distribution on the screen measured for each with the camera. A correction image can then be formed to show any given image at optimal brightness. The formation of the correction can be done automatically at periodic times. This will correct for misalignment, lens distortions and other aberrations.

There can be multiple screens with non-overlapping patterns of elements. Interlaced image data from the projector (or multiple projectors) can then produce a multiple depth plane appearance. The image pixel for one screen would pass though the clear area of the other screen. The high intrinsic transparency allows multiple depth planes to be created with a single projector. The multiple element-array screens can be laminated sheets onto a double-glazed window or two sides of a single window pane.

The projector can also be designed to send pixels in a similar pattern array to the light deflective elements. Methods of doing this include controlling the laser brightness in a scanning laser, and having a microlens array at the array focus between the image element and the projection lens in a projector. A dot screen can be used at the focus of the microlens array to improve efficiency.

The light deflective elements can also include shaped prism elements coated with a liquid crystal layer which creates a strong reflection of polarized off-axis projector (such as an ultra-short throw projector) light, but transmits on-axis ambient light of both orthogonal polarizations. Thus, a high transparency with a substantially zero visibility element at any size of the element is achieved.

The projection elements can also be used with a transparent reflective screen in the arrangement of a head up display for an automotive or aerospace application. Two arrangements of this projection system are suggested.

The first arrangement uses an embodiment of one or more screens with scattering or optical elements aligned with pixels from a projector. The screens are then imaged through a single imaging element such a lens or curved mirror to a transparent reflector to the driver's eye. Multiple depth planes can be realized in the driver's view. This is done by the positioning of the screens relative to the focal plane of the imaging element as to create different virtual depth planes by the imaging element.

The second arrangement is an alternative method for the creating multiple depth planes. In this case a single sheet is used with an imaging element, where the sheet is placed close to the focus of the imaging element. The sheet includes multiple interlaced arrays of optical elements, one of which may be flat or scattering. The other elements may be lens or lens-like optical structures with differing optical power. A projector arrangement with pixels aligned with the elements will see different optical powers in the different paths through the elements, and hence each group will be formed at different distances from the driver, and hence be seen as multiple depth planes.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features:

FIGS. 13(a) and 13(b): Alternative configuration of the display system for a head up display.

DESCRIPTION OF REFERENCE NUMERALS

Figure 1:
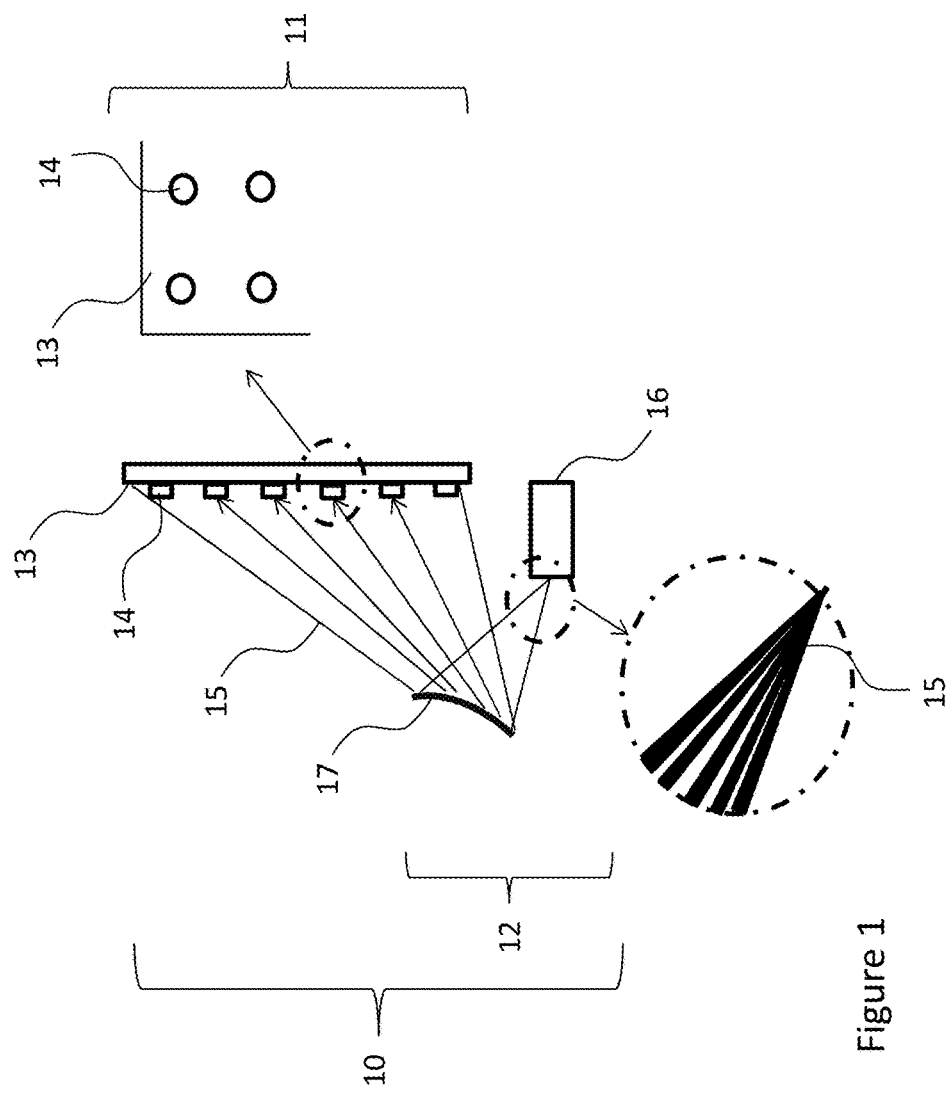
FIG. 1: An exemplary display system in accordance with embodiments of the present invention

10: Transparent display according to an exemplary embodiment

11: A screen according to an exemplary embodiment

11': Second screen for a dual depth functionality

12: A projector system according to an exemplary embodiment

12' An alternative direct projection system

13: Clear material making up the majority of the screen

14: An optical light scattering element on the screen

14a to 14f: Different types of optical elements

15: light rays directed towards the element

15': light rays towards the elements from the alternative projector system

16: An exemplary projector system

17: A curved mirror as part of an ultrashort throw projector system
20: A unit cell on the screen
21: The clear area surrounding the element in a unit cell
22: The area of the element in the unit cell.
50a and 50b: Different arrangements of optical elements
51a, 51b, 51c: Further different arrangements of optical elements
60: High resolution projector system
60': High resolution projector system showing two interlaced images
61: Projected pixels from the projector system with no information
62: Projected pixels from the projector system with information
70, 70': Different fixed image patterns on the projector
71, 71': Measured brightness patterns on the display
72: Processed image correction image
73: Image to be displayed
74: Corrected image to be displayed
81: Projection rays from one image in a dual depth system
82: Projection rays from a second image in a dual depth system
83: Viewing direction to the viewer.
90: Projection system showing well separated pixels in projection
90' An alternative projection system showing well separated pixels
91: The well separated pixels
92: The base lamp in the projection system 90
93: A collimated lens
94: A lens array
95: A projection lens
100: An aperture array
110: A transparent screen with optical structures
111: A liquid crystal layer
112a and 112b: Directions of the optical axes of the liquid crystal
113: Ambient light direction
114: Projected light direction
115: Polarization of projected light
116: Element on transparent screen in the liquid crystal.
120: Projector for a head up display system
121: One depth plane pixel light direction from projector
122: Other depth plane light direction
123, 123': Sheets with optical element arrays
124: Imaging element
125, 125': rays with differing virtual image depth
126: transparent reflector
127: direction to the viewer

DETAILED DESCRIPTION OF INVENTION

An aspect of the invention is a transparent display device. In exemplary embodiments, the display device includes at least one screen that has a plurality of light deflecting elements that are separated by transparent areas, and a projector device. The projector device is configured to direct light onto the light deflecting elements and not onto the transparent areas.

An exemplary embodiment of the present invention is described in connection with the depiction in FIG. 1. This embodiment constitutes a transparent display system 10 and includes a screen 11 and projector 12. The screen 11 has a clear transparent base material 13 that can be plastic (Poly (Methyl Methacrylate) [PMMA], polycarbonate, or like material) or glass. On the screen there exists a number of optical light deflecting elements 14 that are positioned with a spacing between each element. The projector 12 has a projection system 16 and reflector 17 in an "ultra short throw" arrangement where the thickness of the overall system is minimized. The projector 16 is configured such that the pixels of the display image 15 are directed towards the optical light deflecting elements 14 on the screen and substantially not to the clear space between the elements.

Each optical light deflecting element 14 can be a roughened surface that scatters the light directed from the projector. The roughening can be created by a laser incident on the base surface. The elements can also be created on a flexible sheet that can be laminated onto the base surface and need not be created directly on the base surface.

The projector 16 can be for example a colour wheel DLP projector where the red, green and blue colour components are directed along the same pixel path. A micro-mirror directed laser projector would also be appropriate and only one element for each white pixel will be necessary. Alternatively, a separated colour projector such as a colour filter LCOS can be used where each element can be a group of three aligned with the RGB elements of the projector. The precise layout does not affect the scope of the invention.

Figure 2:
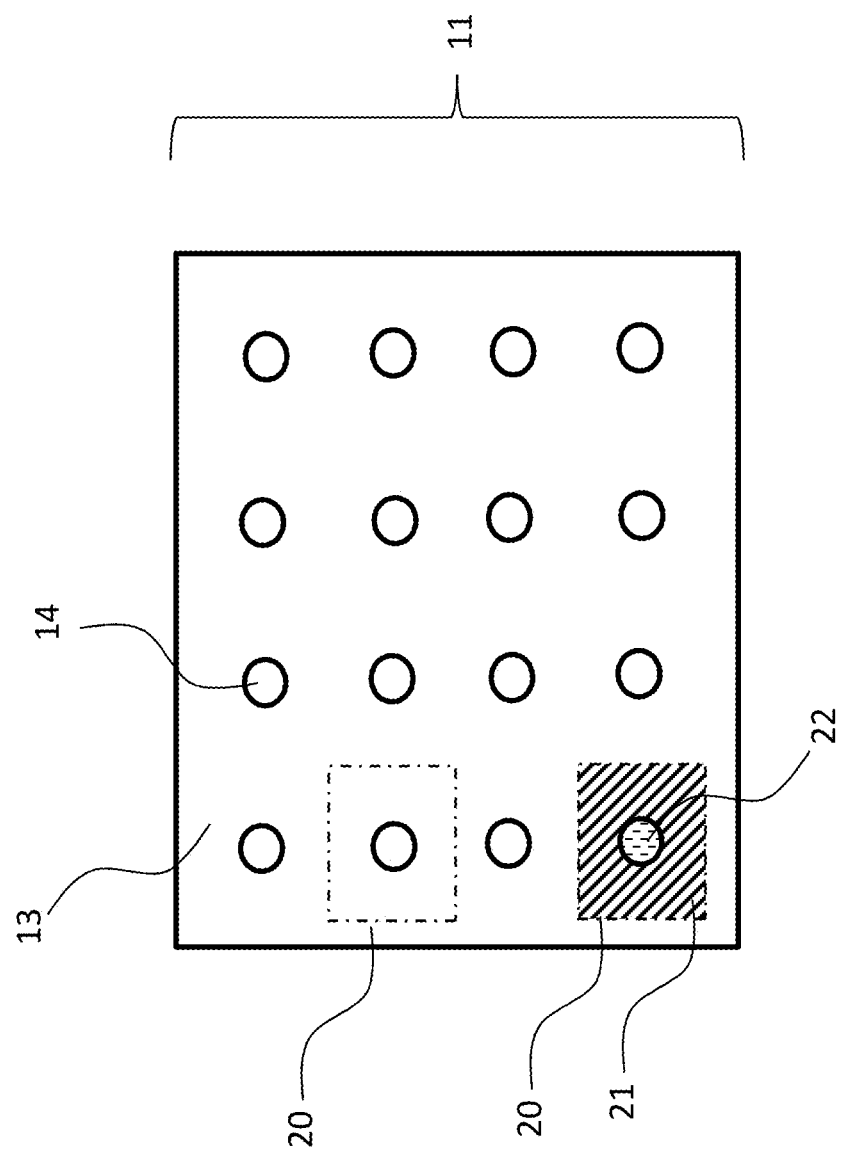
FIG. 2: An exemplary patterned light deflective element unit cell

FIG. 2 shows the arrangement of optical or light deflecting elements 14 on the screen 11. In this embodiment the light deflecting elements 14 are in a regular pattern with the elements forming a repeating pattern of identical unit cells 20 containing one (or more) elements 14 and clear base material 13. The area 21 of the base material is substantially greater than that of the total area 22 of the optical elements. Accordingly, the light deflecting elements 14 are separated by the transparent areas of the base material 13, and an area of the transparent areas is substantially greater than an area of the light deflecting elements.

The simple nature of the screen using scattering areas allows cheap construction over a full range of sizes of the screen. The scattering area formed by a roughened surface would scatter different colours substantially the same and hence would create a wide viewing angle with no colour issues. This invention is also not dependent on materials or any light sensitive chemicals, so appropriate materials can be chosen for a specific application and hence the system reliability is not limited by the screen material. The screen can also show video rate images as determined by the image technology on the projector.

In addition, because the clear area 21 is substantially larger than the element area 22, the transparency of the screen can be very high. For example, elements 0.1 mm in size separated in two directions by 0.3 mm would only have 11% of the unit cell covered by optical elements, allowing a minimum of 89% transparency over the base material, which can have anti-reflection coatings present.

In addition, the direction of light from the projector to the elements allows a high screen efficiency. Depending on the choice of optics for the element, the screen gain (defined as on axis brightness of the display to that of a white titanium dioxide screen showing the same image) can be close to 1 for wide angle or substantially greater than 1 for narrow angle images.

Another measure of efficiency for a transparent screen is the ratio of screen gain/(1−transparency). For a simple scattering sheet or partial mirror showing a wide angle image, this is close to 1, meaning that there is a tradeoff between image brightness and transparency. For this invention, a high transparency is coupled with a high screen gain meaning that gain/(1−transparency)>>1, meaning that this tradeoff is much more favourable for this invention.

Subsequent embodiments of this invention will be described with reference to the exemplary embodiment of FIGS. 1 and 2, and other aspects not mentioned are assumed to be incorporated into subsequent embodiments. Accordingly, like elements are afforded common reference numerals in subsequent figures as in FIGS. 1 and 2.

Figure 3:
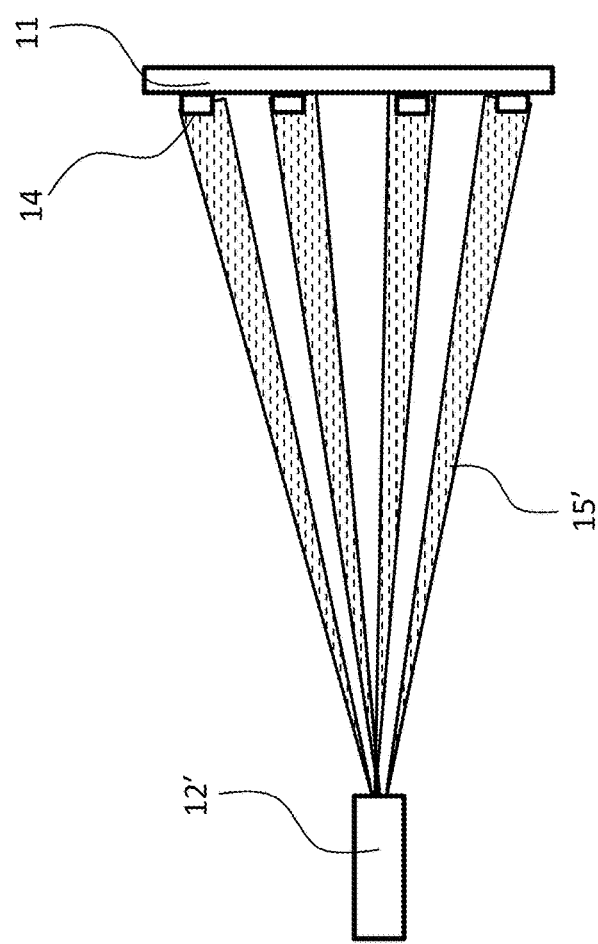
FIG. 3: An exemplary projector arrangement

In a further embodiment shown in FIG. 3, an alternative projector system 12' can be used in which light is directed as denoted by 15' directly onto the screen in the same manner. This would be a "normal throw" or "short throw" projector arrangement and does not require a mirror to image the pixels onto the screen.

The embodiments are shown with the projector and viewer on opposite sides of the screen. However, depending on the choice of optical element, the projector can also be on the same side as the viewer.

In further embodiments shown in FIGS. 4(a) through 4(f), different types of optical light deflecting elements can be used on the screen. This invention covers the use of these or other optical suitable deflection elements not described here. The invention also covers the use of a screen with more than one type of these elements used in different places on the screen. The elements can be made or moulded directly on the base material 13, or can be made onto a sheet that can be laminated onto the base material. The elements are shown facing towards the projector and away from the viewer (to the right), but the optical elements can also exist on the opposite side of the base material, or on both sides.

Figure 4C:
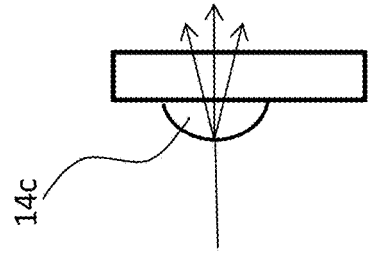
FIGS. 4(a)-4(f): A selection of types of patterned light deflective elements
Figure 4F:
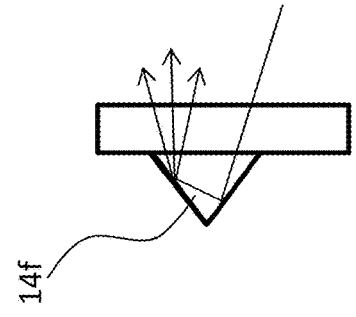
Figure 4B:
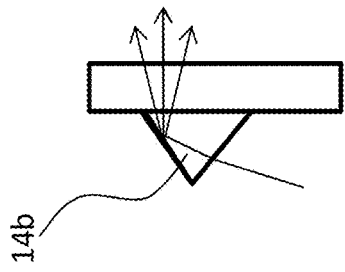
Figure 4E:
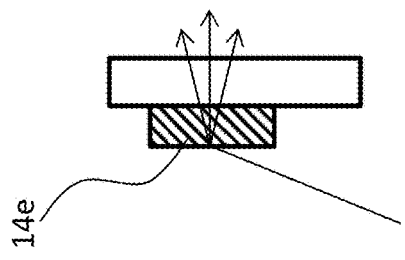
Figure 4A:
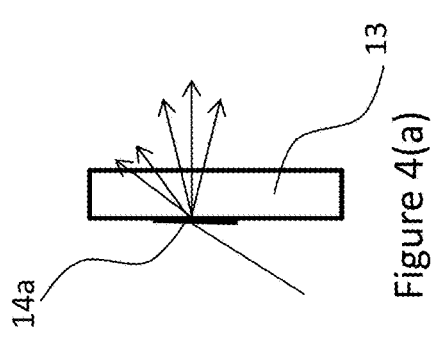

The element 14a of FIG. 4a is an area of scattering. This can be created by laser melting, roughening, embossing or other method. The scattering element can be assumed to scatter to a viewer on one or both sides of the screen as well as at the direction indicated in the figure.

The element 14b of FIG. 4b is a prism structure that directs light from a projector off-axis. The prism may have sides that are scattering or the prism may be simply reflecting a virtual image created by the projector (no scattering surfaces). The prism can be cut into the base material or protruding from it.

The element 14c of FIG. 4c is a lens structure that diverges light from the projector either creating a pixel or changing the location of a virtual image created by the projector. The element can be used in transmission and/or reflection and may be an element of a larger Fresnel lens for virtual image manipulation. The lens can be cut into the base material or protruding from it.

Figure 4D:
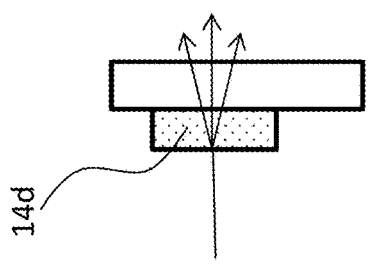

The element 14d of FIG. 4d is a phosphor or nanophosphor layer that can react to the projector being a pump beam. Multiple different phosphors can be used with one or more different projector pump beams (blue or UV).

The element 14e of FIG. 4e is a holographic directing layer for one or more colours that may be laser beams from the projector. This can be used in transmission or reflection.

The element 14f of FIG. 4f is a reflecting prism which can be a retro-reflecting prism. This is designed to be used in reflection for achieving a high on axis brightness. The mirror surfaces of the prism can be smooth or scattering.

The embodiments of FIGS. 5(a) through 5(e) show different arrangements of optical light deflecting elements on the screen.

Figure 5B:
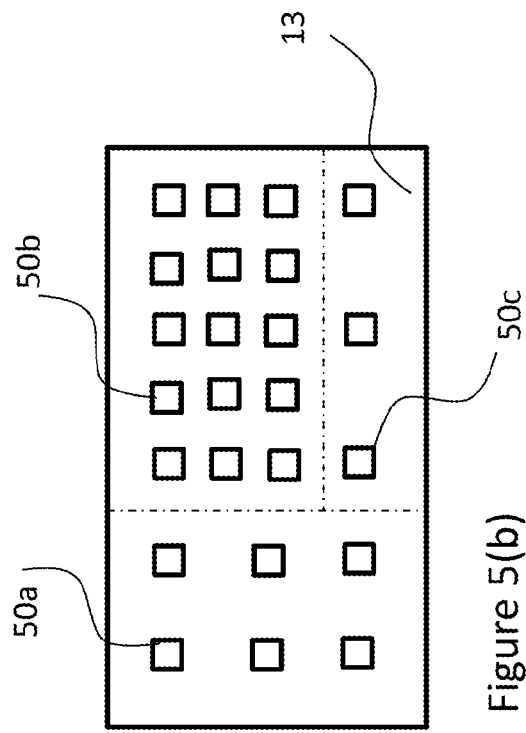
FIGS. 5(a)-5(e): A selection of different configurations to arrange the patterned light deflective elements
Figure 5D:
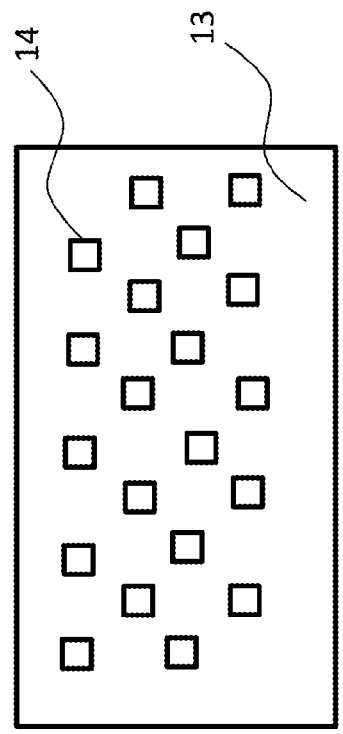
Figure 5A:
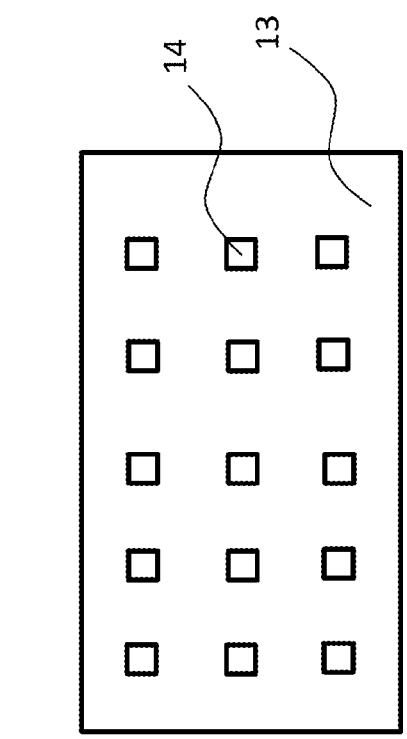

FIG. 5a shows a regular rectangular array as described in the embodiment of FIG. 2. The elements 14 can be the same or different types as described with respect to FIGS. 4(a)-4(f).

FIG. 5b shows different regular patterns 50a, 50b and 50c in different sections of the screen. The elements can also be different types of optical element, and sizes and spacings can all be different in the different areas. Three zones are shown, but it will be appreciated that any number of two or more zones may be employed.

Figure 5C:
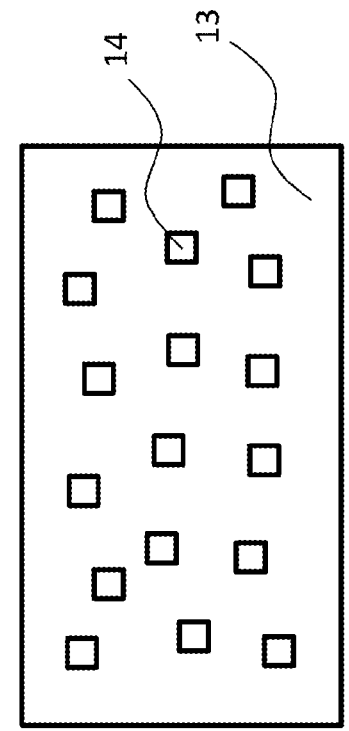

FIG. 5c shows an irregular or random or semi-random pattern of elements on the screen.

FIG. 5d shows a hexagonal or shifted rectangular pattern on the screen.

Figure 5E:
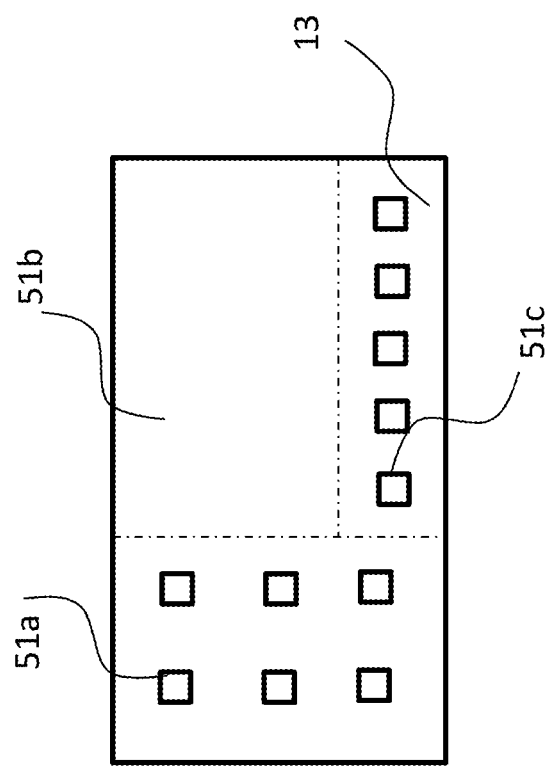

FIG. 5e shows two or more zones 51a, 51b, 51c that can have different patterns in each zone either regular or irregular. There may also be zones that do not have any elements in them (51b).

Other patterns of optical elements may be employed, in which the area of the clear portions is substantially greater than the area including the optical elements, and light can be directed substantially onto the optical elements. It will be appreciated that the invention is not limited to any particular arrangement of optical elements, and such arrangements may combine the different types of optical elements described above in any manner.

Figure 6:
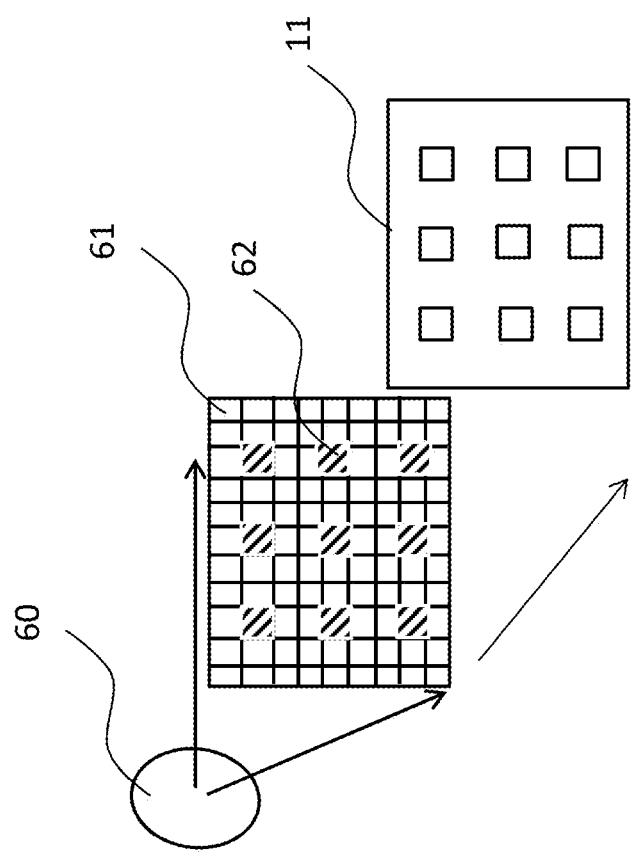
FIG. 6: Use of a higher resolution projector

FIG. 6 shows a projector 60 that produces pixels in localised directions. In this embodiment a high resolution projector projects a large number of pixels 61 onto the screen 11. However, the majority of these pixels are black and only those pixels 62 aligned with the optical elements have picture information on them. Accordingly, the projector may be configured to project a plurality of pixels onto the screen, and the projector projects black pixels onto the transparent areas and pixels with picture information onto the light deflecting elements.

Figure 7:
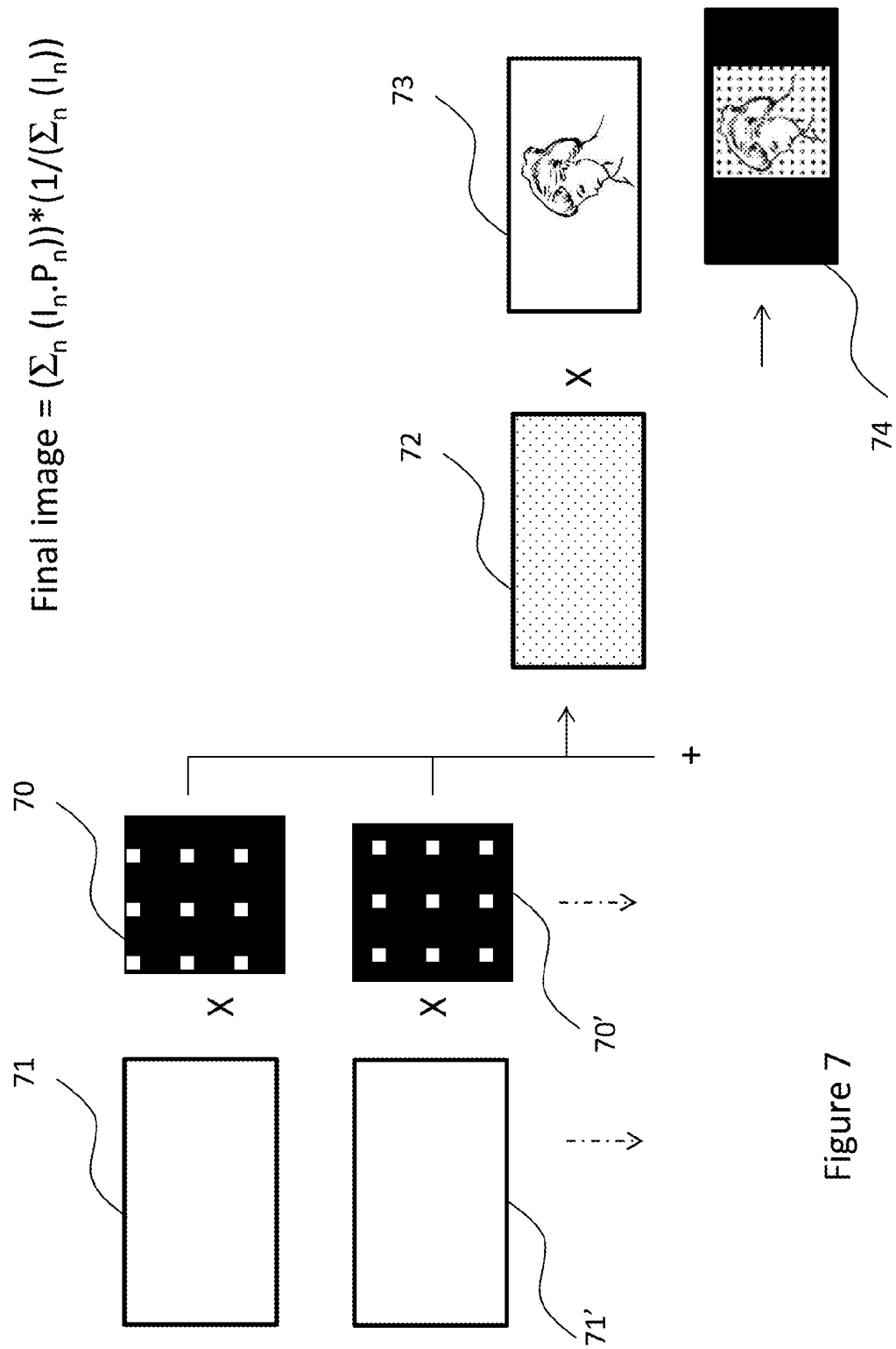
FIG. 7: A method to calibrate the image alignment

FIG. 7 shows a method for the determination of which pixels from a high resolution projector are aligned to the screen. This method has the additional advantage of being used for any pattern of optical elements (not just a regular array), and also corrects for misalignment and lens aberrations. The projector may be configured to generate multiple repeating patterns corresponding to a group of pixels with an average brightness, and an image is generated by combining the multiple repeating patterns. For example, in the geometry, the unit cell size (or approximate element spacing) on the screen corresponds to 4×4 pixels on the projector. This approach will still work even if the unit cell spacing is significantly different or is a random or changing array. Thus, it is possible to create 16 different repeating patterns 70, 70' etc. with a different pixel (or group of pixels) on in each pattern. An average brightness across the patterns for each pixel will be the same for all pixels.

Each pattern is then displayed on the screen and an image of the screen brightness 71, 71' etc. with that pattern is taken. Each image is multiplied by the original pattern and the sum of all of these products is taken as denoted by numeral 72. This is then the calibration image.

Image processing of the images 71 can be chosen according to lighting conditions in order to get a balanced brightness across the screen.

This image 72 is them multiplied by the image (or video frame) to be displayed 73 to give the corrected image 74. This image will then be displayed with an alignment to the elements on the screen.

This method can be automated with a video camera and can be done periodically in use in order to maintain brightness and alignment of a screen.

Figure 8:
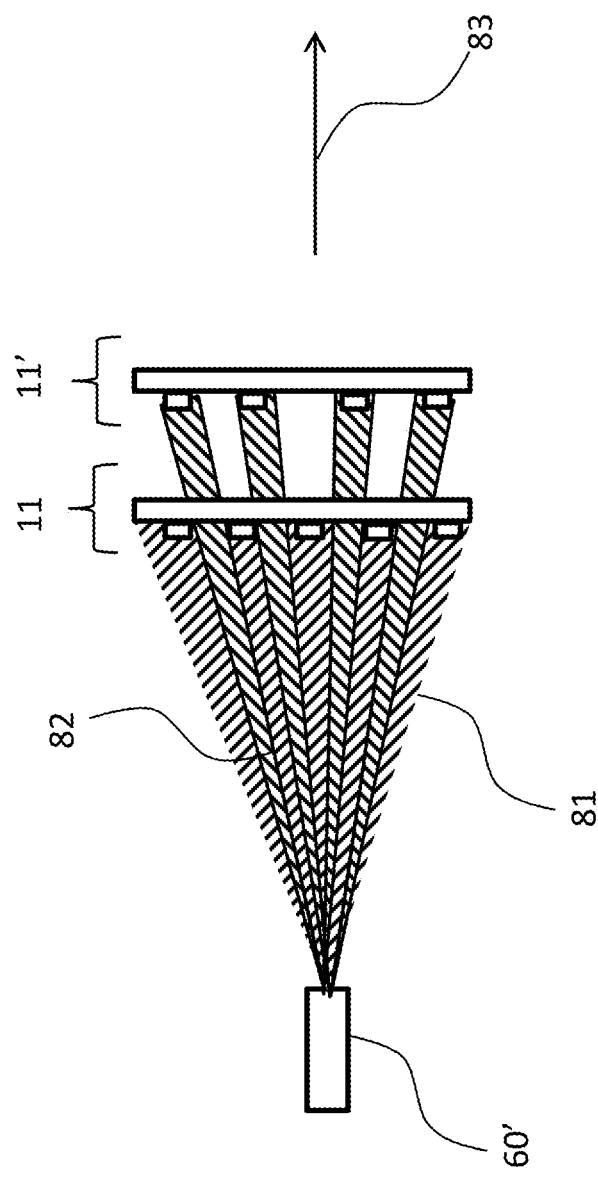
FIG. 8: Display system with two screens to generate multiple depth planes FIGS. 9(a) and (b): An exemplary projector with the same resolution as the screen

In other exemplary embodiments, the display device includes a first screen and a second screen separated longitudinally relative to the projector device, wherein the first screen and the second screen respectively has a first plurality and a second plurality of light deflecting elements that are separated by transparent areas. The projector device is configured to direct light onto the light deflecting elements and not onto the transparent areas of the first screen and the second screen such that light from the first and second light deflecting elements appear in different virtual depth planes. FIG. 8 illustrates such a further embodiment for a dual depth transparent screen, where two (or more) images are shown at different longitudinal distances. This embodiment includes a high resolution projector 60' and two screens 11 and 11' whose first and second pluralities of light deflecting elements are not overlapping from the point of view of the projector, and separated longitudinally away from the projector.

The pitch of a regular array on the two screens will be different. If the distance from screen 11 to the projector is D, the pitch of elements on screen 11 is p and the separation of the two screens 11 and 11' is d, then the pitch p' on the screen 11' will be p'=Dp/(D+d).

The projector device may be configured to direct light of a first image onto the first light deflecting elements of the first screen interlaced with light of a second image directed onto the second light deflecting elements of the second screen such that the first and second images appear in different virtual depth planes. If one image 81 aligned with screen 11 elements is interlaced with an image 82 aligned with screen 11' elements, then two separate images will be shown to a viewer on either side of the screen at different depths. The high transparency of each screen would ensure that the furthest image is not greatly diminished by the nearer screen. FIG. 8 shows that the light from each pixel 81 exactly overlaps the light from the other image's pixel 82, but in general this is not the case and the majority of pixels are still black and the majority of the area on the screen is still clear.

Figure 9:
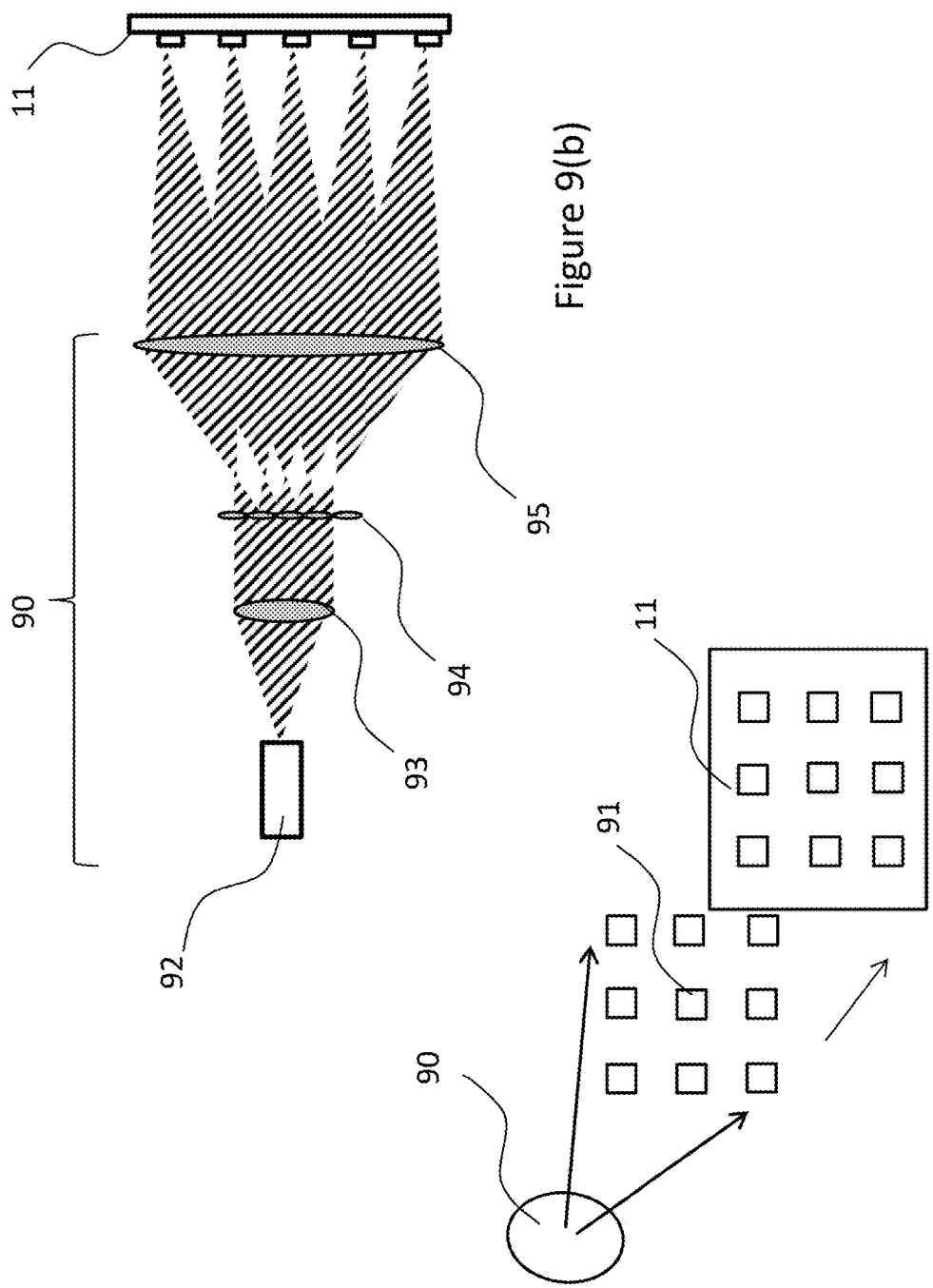

FIG. 9(a) shows an alternative projector 90 where the pixels are already separated by the requisite amount and directly aligned to the screen light deflecting elements. This is more efficient in terms of energy efficiency, resolution and data flow. FIG. 9(b) shows a means by which this can be done, with the following components arranged in a light emitting direction. A lamp projector 92 can be a micro-mirror laser projector or DLP or other projector. A telecentric lens 93 can be used, directly after the projector in the case of a micro-mirror laser projector or in place of the projection lens for a DLP projector. A microlens array 94 creates a pixel array of the image with high separation between the focus areas, this creating the separation. A projection lens 95 then projects the focused pixels onto the optical elements of the screen 11.

Figure 10:
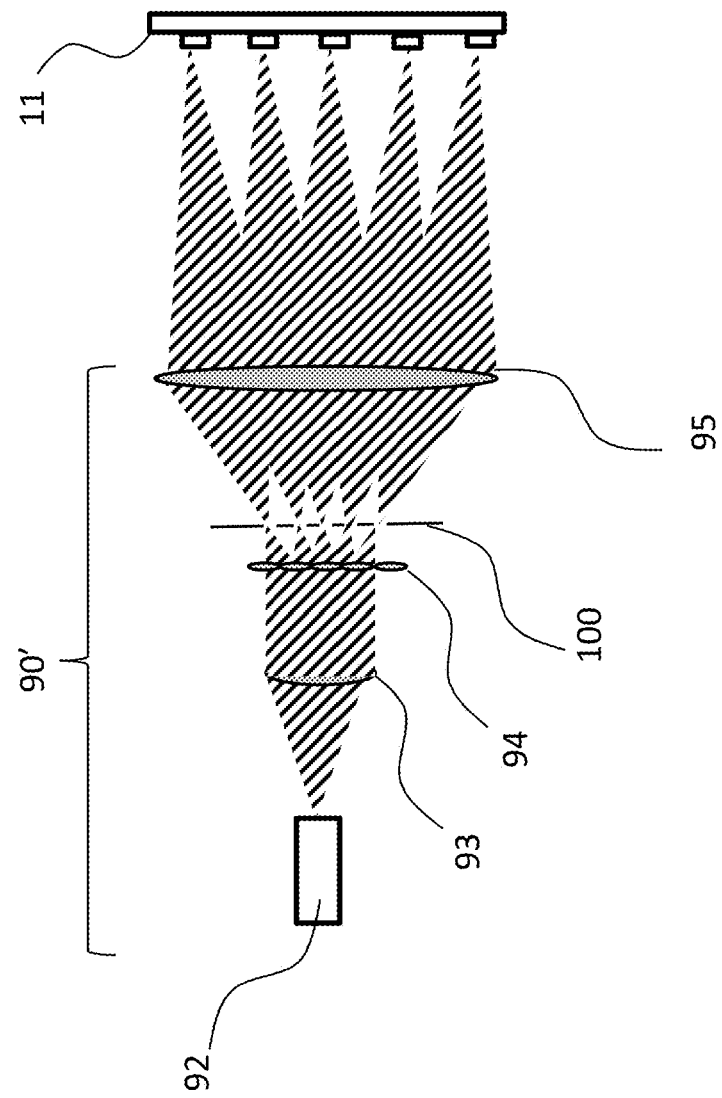
FIG. 10: An alternative design of the exemplary projector

FIG. 10 shows a variation of this arrangement whereby an aperture mask 100 is used to improve the contrast between the focus areas and the other areas to improve the alignment with the screen elements.

Figure 11:
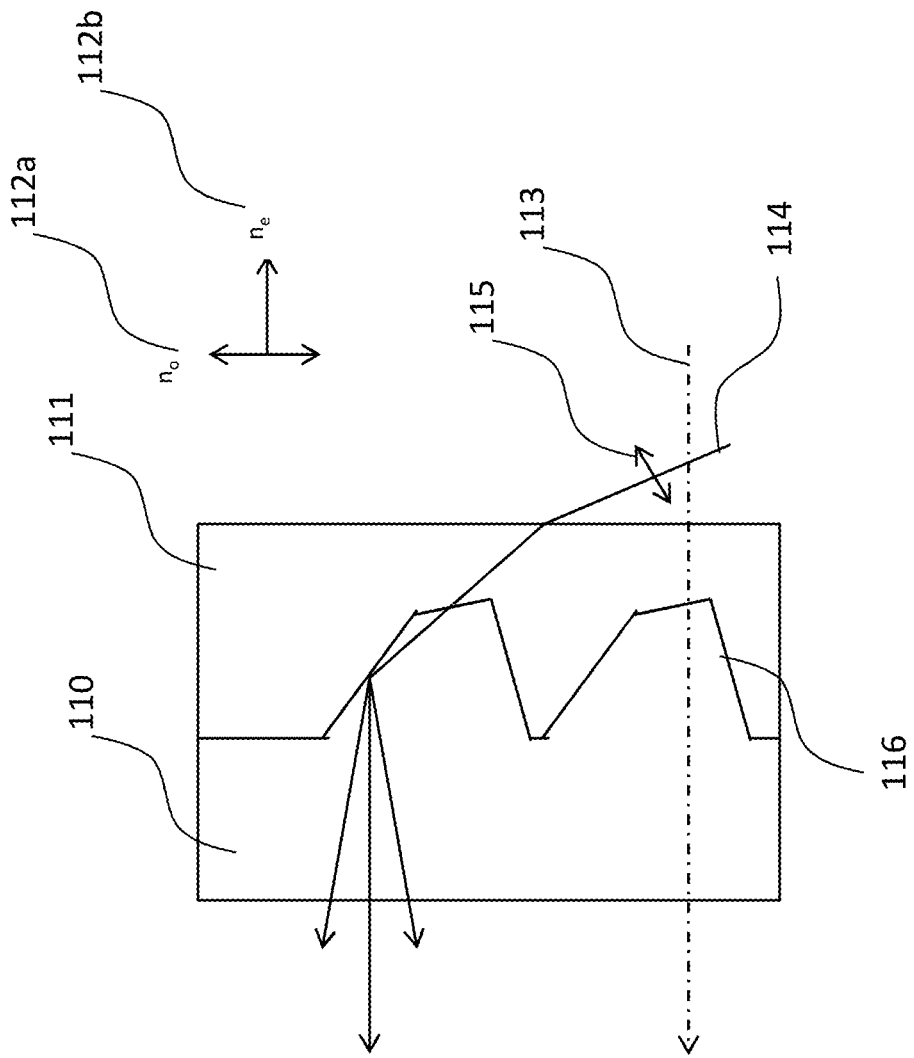
FIG. 11: Screen configuration including use of prism elements with a liquid crystal layer

FIG. 11 shows an alternative approach that has much lower visibility of the optical elements, which allows the optical elements to be larger in size. In such embodiment, the screen may include a transparent base material with the light deflecting elements being deformations formed in the base material. As seen in FIG. 11, for example, this embodiment may include a base material 110 that can be a plastic or glass with light deflecting elements 116 either moulded, cut or laminated by sheet onto the base material. The features have a distorted trapezoid shape as drawn in the diagram, although any suitable shape may be employed.

A birefringent liquid crystal or other birefringent layer 111 with a an ordinary axis refractive index 112a substantially the same as the plastic or glass of the features 116 is used and is layered over these features. The extraordinary axis refractive index 112b should be different from the ordinary axis, and the layer is such that the extraordinary axis is positioned parallel to the normal from the base surface 110, away from the features.

Ambient light 113 from the scene incident normal to the screen will see only the ordinary axis of the liquid crystal and the base material, so the effect of the features on the path of the light will be minimized. Hence the clarity and transparency of the screen will be very high. This will be true even if the ambient light is unpolarised.

Light 114 incident off-axis from an ultrashort throw projector is polarized in a direction 115 where there is a substantial component in the extraordinary axis direction of the liquid crystal. In this case there will be refraction at the outside surface and at the entrance to the features such that meeting the top surface of the feature will cause total internal reflection and direct light forward to the viewer, hence creating a high efficiency image.

The surfaces of the light deflecting elements 116 may be rough in order to scatter the image into a window, or smooth if a virtual image is created by the projector. The projector may also use a telecentric lens arrangement in order to maintain efficiency and allow the features on the screen to be identical to aid fabrication.

Figure 12:
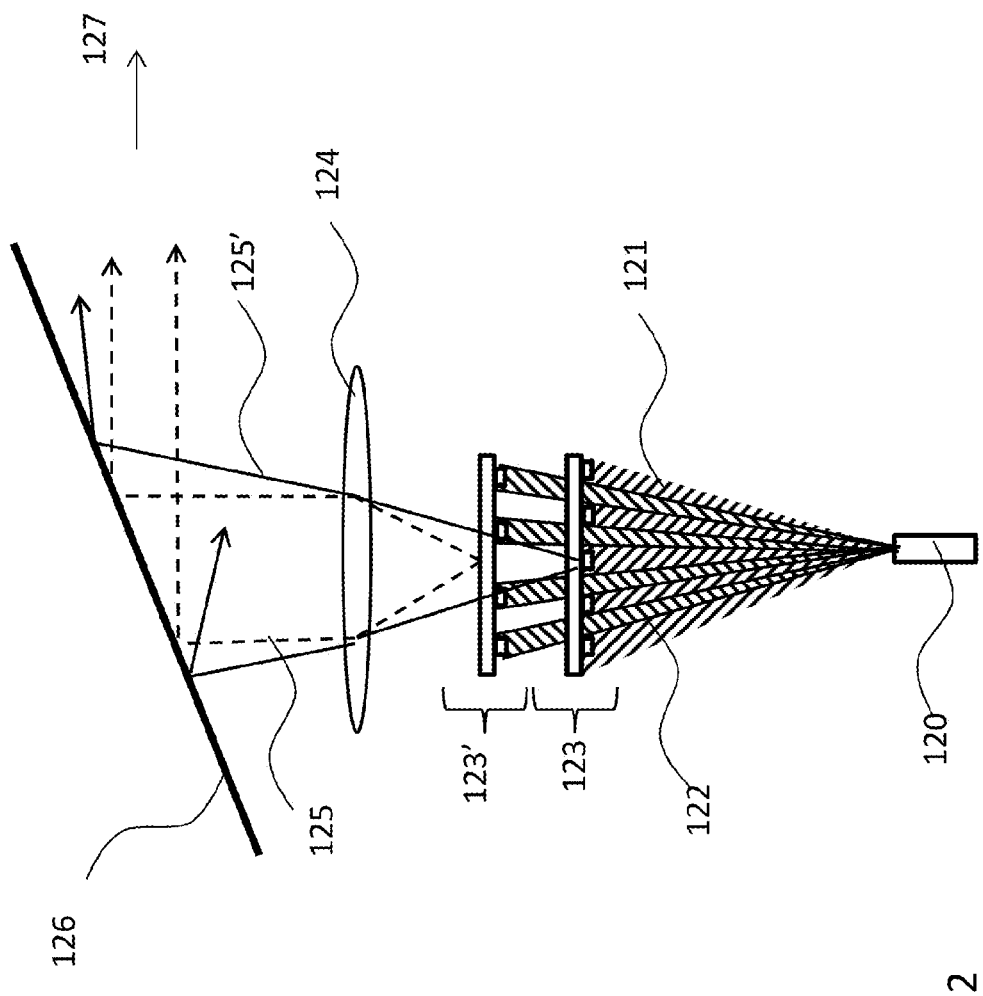
FIG. 12: Configuration of display system for a head up display

In a further embodiment shown in FIG. 12, the transparent display system is arranged to show a virtual image to a viewer through a transparent reflector, in a vehicle type head-up display configuration. This can be used in automotive and aerospace applications.

This embodiment includes one or more screens 123, 123' with patterns of optical elements that are not overlapping. The figure shows two screens producing two virtual depth planes, but it is understood that one or more sheets producing one or more depth planes can be used.

A projector 120 producing pixels 121, 122 from an interlaced set of images are directed towards the elements on the two sheets. Pixels 121 produce a single depth plane aligned with the optical light deflecting elements of the lower sheet 123 and pixels 122 are aligned with the optical light deflecting elements of the upper sheet 123'. The sheets are positioned near the focus plane of an imaging element, 124, that is shown as a lens but could also be a curved mirror. This imaging element forms two virtual planes from the two sheets, because of the relative separation of the sheets. The rays from the two sheets 125 and 125' come from different virtual depths and are reflected by a transparent reflector 126. The reflector can be a known technology such as a partial-silvered mirror or interference film with high reflection at RGB laser wavelengths, if such lasers are used in the projector. The viewer from direction 127 then can see two different images at two different depths.

In the above embodiment the optical elements do not overlap from the point of view of the projector, but in this case it is not required that the elements have a low percentage coverage. It is possible that the total area covered by all sheets can be close to 100% of the illuminated area of the projector.

In another alternative embodiment, the display device include a single screen and a projector device. The screen has a plurality of first light deflecting elements and a plurality of second light deflecting elements, and an optical power of the first light deflecting elements is different from an optical power of the second light deflecting elements. The projector device is configured to direct light onto the first and second light deflecting elements such that light from the first and second light deflecting elements appear in different virtual depth planes. The first light deflecting elements may be interlaced on the screen with the second light deflecting elements.

Such an alternative arrangement is shown in FIGS. 13a and 13b. This arrangement differs from the embodiment of FIG. 12 in that the multiple sheets are replaced by a single sheet 130 on which are patterned different optical elements of differing optical power. Optical elements of differing optical power is shown in FIG. 13b. In this embodiment, the sheet substrate 132 has two sets of interlaced optical elements 133 and 134 which have differing optical power. The element 133 is a lens shape while 134 is a flat area of substrate. It is not necessary that there be a flat area and it is not necessary that flat areas be between lens elements, as any suitable arrangement having optical elements of different optical powers may be employed. Rays from different images 121 and 122 impact on the different elements and the virtual focus of each will be different when reaching the main focusing element 124, which then images the two rays 131, 131' into two different virtual distances. These are then reflected by the reflector 126 and seen by the viewer 127 as two different images at different depths.

As with the previous embodiment, two depth planes are shown, but one or multiple planes can be formed by interlacing images in pixels and having differing elements in the sheet 130 all with different optical powers, which can be positive and negative.

An aspect of the invention, therefore, is a display device. In exemplary embodiments, the display device includes at least one screen that has a plurality of light deflecting elements that are separated by transparent areas, and a projector device. The projector device is configured to direct light onto the light deflecting elements and not onto the transparent areas.

In an exemplary embodiment of the display device, an area of the transparent areas is substantially greater than an area of the light deflecting elements.

In an exemplary embodiment of the display device, the plurality light deflecting elements comprises at least one of light scattering elements, prisms that deflect light from the projector on axis or off axis, lens structures that diverge light from the projector, or phosphor or nanophosphor layers.

In an exemplary embodiment of the display device, the plurality of light deflecting elements comprises more than one type of light deflective elements.

In an exemplary embodiment of the display device, the plurality of light deflecting elements are arranged in the screen in a rectangular array.

In an exemplary embodiment of the display device, the plurality of light deflecting elements are arranged in the screen in a an irregular pattern.

In an exemplary embodiment of the display device, the plurality of light deflecting elements are arranged in different patterns in different sections of the screen.

In an exemplary embodiment of the display device, the projector device is configured to project a plurality of pixels onto the screen, and the projector device projects black pixels onto the transparent areas and pixels with picture information onto the light deflecting elements.

In an exemplary embodiment of the display device, the projector device is configured to generate multiple repeating patterns corresponding to a group of pixels with an average brightness, and an image is generated by combining the multiple repeating patterns.

In an exemplary embodiment of the display device, pixels of the projector device are directly aligned with the light deflecting elements of the screen.

In an exemplary embodiment of the display device, the projector device includes in a light emitting direction: a lamp projector; a telecentric lens; a microlens array that generates a pixel array corresponding to an alignment of the light deflecting elements on the screen; and a projection lens that projects the pixel array onto the light deflecting elements.

In an exemplary embodiment of the display device, the projector device further includes an aperture mask behind the microlens array that enhances the alignment of the pixel array and the light deflecting elements.

In an exemplary embodiment of the display device, the screen includes a transparent base material and the light deflecting elements are deformations formed in the base material.

In an exemplary embodiment of the display device, the display device includes a first screen and a second screen separated longitudinally relative to the projector device, wherein the first screen and the second screen respectively has a first plurality and a second plurality of light deflecting elements that are separated by transparent areas. The projector device is configured to direct light onto the light deflecting elements and not onto the transparent areas of the first screen and the second screen such that light from the first and second light deflecting elements appear in different virtual depth planes.

In an exemplary embodiment of the display device, the first light deflecting elements of the first screen and the second light deflecting elements of the second screen do not overlap from a point of view of the projector device.

In an exemplary embodiment of the display device, the projector device is configured to direct light of a first image onto the first light deflecting elements of the first screen interlaced with light of a second image directed onto the second light deflecting elements of the second screen such that the first and second images appear in different virtual depth planes.

In an exemplary embodiment of the display device, pixels for the first and second images respectively are aligned with the first and second light deflecting elements.

In an exemplary embodiment of the display device, the display device further includes a transparent reflector that reflects the first and second images into a viewing direction.

In an exemplary embodiment of the display device, the display device includes a screen having a plurality of first light deflecting elements and a plurality of second light deflecting elements, and an optical power of the first light deflecting elements is different from an optical power of the second light deflecting elements, and a projector device. The projector device is configured to direct light onto the first and second light deflecting elements such that light from the first and second light deflecting elements appear in different virtual depth planes.

In an exemplary embodiment of the display device, the first light deflecting elements are interlaced on the screen with the second light deflecting elements.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

Industrial application lies in window displays for advertising, signage and information display. Applications can be in retail premises, both inside and outside for small and large area type displays. A principal advantage is that the display does not require bright lighting behind the display, and thus does not need to be used with enclosed boxes, though of course they can. Applications also include automotive head up displays, residential "screen" type displays, information display or TV. Applications also include training and video conferencing where the cameras are directly behind the screen (eye contact video conferencing). The display can also be used for curved applications or unusual or freeform geometries (such as a transparent cylinder) that are not possible with LC or OLED displays. There are further applications in head mounted displays using pico-projection systems.

The invention claimed is:

1. A display device comprising:
    at least one screen that has a plurality of light deflecting elements that are separated by transparent areas, the screen comprising a sheet of a clear material on which are patterned the plurality of light deflective elements; and
    a projector device;
    wherein the projector device is configured to direct light onto the light deflecting elements and not onto the transparent areas; and
    wherein an area of the transparent areas is substantially greater than an area of the light deflecting elements.

2. The display device of claim 1, wherein the plurality light deflecting elements comprises at least one of light scattering elements, prisms that deflect light from the projector on axis or off axis, lens structures that diverge light from the projector, or phosphor or nanophosphor layers.

3. The display device of claim 2, wherein the plurality of light deflecting elements comprises more than one type of light deflective elements.

4. The display device of claim 1, wherein the plurality of light deflecting elements are arranged in the screen in a rectangular array.

5. The display device of claim 1, wherein the plurality of light deflecting elements are arranged in the screen in an irregular pattern.

6. The display device of claim 1, wherein the plurality of light deflecting elements are arranged in different patterns in different sections of the screen.

7. The display device of claim 1, wherein the projector device is configured to generate multiple repeating patterns corresponding to a group of pixels with an average brightness, and an image is generated by combining the multiple repeating patterns.

8. The display device of claim 1, wherein pixels of the projector device are directly aligned with the light deflecting elements of the screen.

9. The display device of claim 8, wherein the projector device comprises in a light emitting direction:
    a lamp projector;
    a telecentric lens;
    a microlens array that generates a pixel array corresponding to an alignment of the light deflecting elements on the screen; and
    a projection lens that projects the pixel array onto the light deflecting elements.

10. The display device of claim 9, wherein the projector device further comprises an aperture mask behind the microlens array that enhances the alignment of the pixel array and the light deflecting elements.

11. The display device of claim 1, wherein the screen comprises a transparent base material and the light deflecting elements are deformations formed in the base material.

12. A display device of claim 1, comprising:
    a first screen and a second screen separated longitudinally relative to the projector device, wherein the first screen and the second screen respectively has a first plurality and a second plurality of light deflecting elements that are separated by transparent areas; and
    wherein the projector device is configured to direct light onto the light deflecting elements and not onto the transparent areas of the first screen and the second screen such that light from the first and second light deflecting elements appear in different virtual depth planes.

13. The display device of claim 12, wherein the first light deflecting elements of the first screen and the second light deflecting elements of the second screen do not overlap from a point of view of the projector device.

14. The display device of claim 13, wherein the projector device is configured to direct light of a first image onto the first light deflecting elements of the first screen interlaced with light of a second image directed onto the second light deflecting elements of the second screen such that the first and second images appear in different virtual depth planes.

15. The display device of claim 14, wherein pixels for the first and second images respectively are aligned with the first and second light deflecting elements.

16. The display device of claim 14, further comprising a transparent reflector that reflects the first and second images into a viewing direction.

* * * * *